(12) United States Patent
Tigani et al.

(10) Patent No.: US 7,249,354 B2
(45) Date of Patent: Jul. 24, 2007

(54) SYSTEM AND METHOD FOR DEPLOYING A SOFTWARE BUILD FROM A PLURALITY OF SOFTWARE BUILDS TO A TARGET COMPUTER

(75) Inventors: Jordan Tigani, Seattle, WA (US); Joseph Holman, Kirkland, WA (US); Pankaj S. Lunia, Redmond, WA (US); David E. Gonsalves, Duvall, WA (US); Michael Warmington, Redmond, WA (US); Justin Michael Caton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 10/684,696

(22) Filed: Oct. 14, 2003

(65) Prior Publication Data

US 2005/0081186 A1 Apr. 14, 2005

(51) Int. Cl.
*G06F 9/445* (2006.01)
(52) U.S. Cl. .............. 717/177; 717/101; 717/121; 717/174; 709/203
(58) Field of Classification Search ........ 717/101–113, 717/121, 168–178; 709/201–203
See application file for complete search history.

(56) References Cited

U.S. PATENT DOCUMENTS

| | | | | |
|---|---|---|---|---|
| 5,752,042 A | * | 5/1998 | Cole et al. | 717/173 |
| 5,878,218 A | * | 3/1999 | Maddalozzo et al. | 709/213 |
| 5,933,647 A | * | 8/1999 | Aronberg et al. | 717/178 |
| 6,141,758 A | * | 10/2000 | Benantar et al. | 726/10 |
| 6,151,643 A | * | 11/2000 | Cheng et al. | 710/36 |
| 6,446,109 B2 | * | 9/2002 | Gupta | 709/203 |
| 2002/0100038 A1 | * | 7/2002 | Balassanian | 717/177 |

OTHER PUBLICATIONS

Hammi, R., et al., "Deployment and Experimentation of an Active Network at a Large Scale: AMARRAGE," *Proceedings of the Conference on Network Control and Engineering for QoS, Security and Mobility (Net-Con 2002)*, IEEE, Paris, France, Oct. 23-25, 2002, pp. 141-152.

Kilany, R., and A. Serhrouchni, "ANS-2: A General Purpose Active Network Simulator," as early as Jul. 2002, <http://www.fi.usj.edu.lb/prof/Rima_Kilany/ANS-2/ANS-2.pdf> [retrieved Feb. 13, 2004].

(Continued)

*Primary Examiner*—Meng-Al T. An
*Assistant Examiner*—Michael Yaary
(74) *Attorney, Agent, or Firm*—Christensen O'Connor Johnson Kindness PLLC

(57) ABSTRACT

A system and method for deploying a software build from a plurality of software builds is presented. A target computer sends a request for the software build to a build master. The build master authenticates the request, permitting only authorized requests. If the request is authorized, the build master identifies a build server that stores the requested software build. The build master generates request data that identifies the build server and authentication information, and returns the request data to the target computer. The target computer submits the request, with the request data, to the build server. The build server authenticates the request according to the request data. If the request is an authorized request, the build server returns the software build to the target computer.

18 Claims, 7 Drawing Sheets

OTHER PUBLICATIONS

Kilany, R., and A. Serhrouchni, "Using Distributed Component Model for Active Service Deployment," *Proceedings of the Seventh International Symposium on Computers and Communications*, IEEE, Taormina-Giardini Naxos, Italy, Jul. 1-4, 2002, pp. 1-6.

Martin, J.D., and A.D. Brooks, "Automated Generic Operating System Installation and Maintenance," *Proceedings of the 3rd Large Installation System Administration of Windows NT/2000 Conference*, Seattle, Washington, Aug. 1-2, 2000, pp. 61-69.

* cited by examiner

US 7,249,354 B2

SYSTEM AND METHOD FOR DEPLOYING A SOFTWARE BUILD FROM A PLURALITY OF SOFTWARE BUILDS TO A TARGET COMPUTER

FIELD OF THE INVENTION

The present invention relates to computer software, and in particular, to deploying multiple builds of a computer software application to a target computer.

BACKGROUND OF THE INVENTION

In order to achieve broad customer acceptance for a computer software application, software providers must make their software applications available in a variety of configurations. These software applications may be configured according to a variety of factors, including spoken languages, computer hardware systems, single and multi-user systems, enterprise systems, and home/professional systems, to name just a few. Operating systems are excellent examples of software applications which are available in a wide variety of configurations. For example, configurations of Microsoft Corporation's Windows operating system are currently available in English, French, Spanish, and German, to name just as few, as well as student, home, and professional editions, and small office and enterprise versions. Each specific configuration is generally referred to as a build of the software application, or more simply a build, because the application must be particularly built, i.e., compiled, assembled, linked, etc., to create a particular configuration.

For a single user, obtaining a particular software build, and installing the build on the user's computer, is a relatively straightforward task. However, in other situations, deploying the build to a target computer can be quite challenging. For example, multinational enterprises may require a variety of different builds of the same software application within the enterprise. Some enterprise users may require advanced tools that are part of a professional build, while others may need only the basics. Still further, some of the offices in the enterprise may require an English build, while other offices need other languages, such as a French build. Clearly, for these types of enterprises, centralizing the distribution, or deployment, of a standard software application can be complex and challenging. More often, there is no centralized control. Instead, information technology (IT) personnel in each office operate semi-autonomously.

Hardware vendors are also faced with the challenge of deploying multiple builds of the same software application. For example, hardware vendors typically install an operating system on each system that is sold. In order to sell their computer systems to more than one class of user, e.g. home users and business users, the hardware vendor must be adaptable, able to install a particular operating system build according to a user's request. However, deploying the particular operating system build must be done efficiently in order to be delivered profitably. Of course, hardware vendors also commonly install numerous other software applications on a new system, many of which are available in a variety of configurations/builds, and must be deployed according to the particular operating system build installed on the new system. Clearly, hardware vendors would benefit from a system and method for deploying multiple software application builds onto a target computer.

Software providers, those who develop software applications in multiple configurations, would also benefit from a system and method for deploying multiple software application builds onto a target computer. For example, the software provider's quality assurance personnel, i.e., testers, are charged with testing all of a software application's builds. This often requires that testers install one build, run their battery of tests against that build, analyze the results, uninstall the build, and then repeat the process with another build. Clearly, efficiently managing the installation/deployment of the builds onto a tester's computer would reduce the amount of time involved with installing each build, and increase the amount of time that the tester could focus on quality assurance.

What is needed is a system and method capable of deploying multiple software application builds to a target computer. The present invention addresses these needs, and others, found in the prior art.

SUMMARY OF THE INVENTION

In accordance with aspects of the present invention, a system is provided for deploying a software build of a plurality of software builds onto a target computer. The system includes a build master that, in response to a request from the target computer for the software build, identifies a build server that stores the software build. The build master returns request data to the target computer, including information identifying the build server storing the software build. The system also includes a plurality of build servers, each build server storing at least one of the plurality of software builds. A build server, upon receiving a request for the software build stored on the build server, returns the build to the target computer.

In accordance with further aspects of the present invention, a method for deploying a software build from a plurality of software builds to a target computer is provided. A first request for the software build is submitted from the target computer to the build master. In response to the first request, the build master identifies a build server that stores the software build. The build master generates request data, including information identifying the build server storing the software build. The request data is returned to the target computer. The target computer submits the request with the request data to the build server identified in the request data. In response, the build server returns the software build to the target computer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
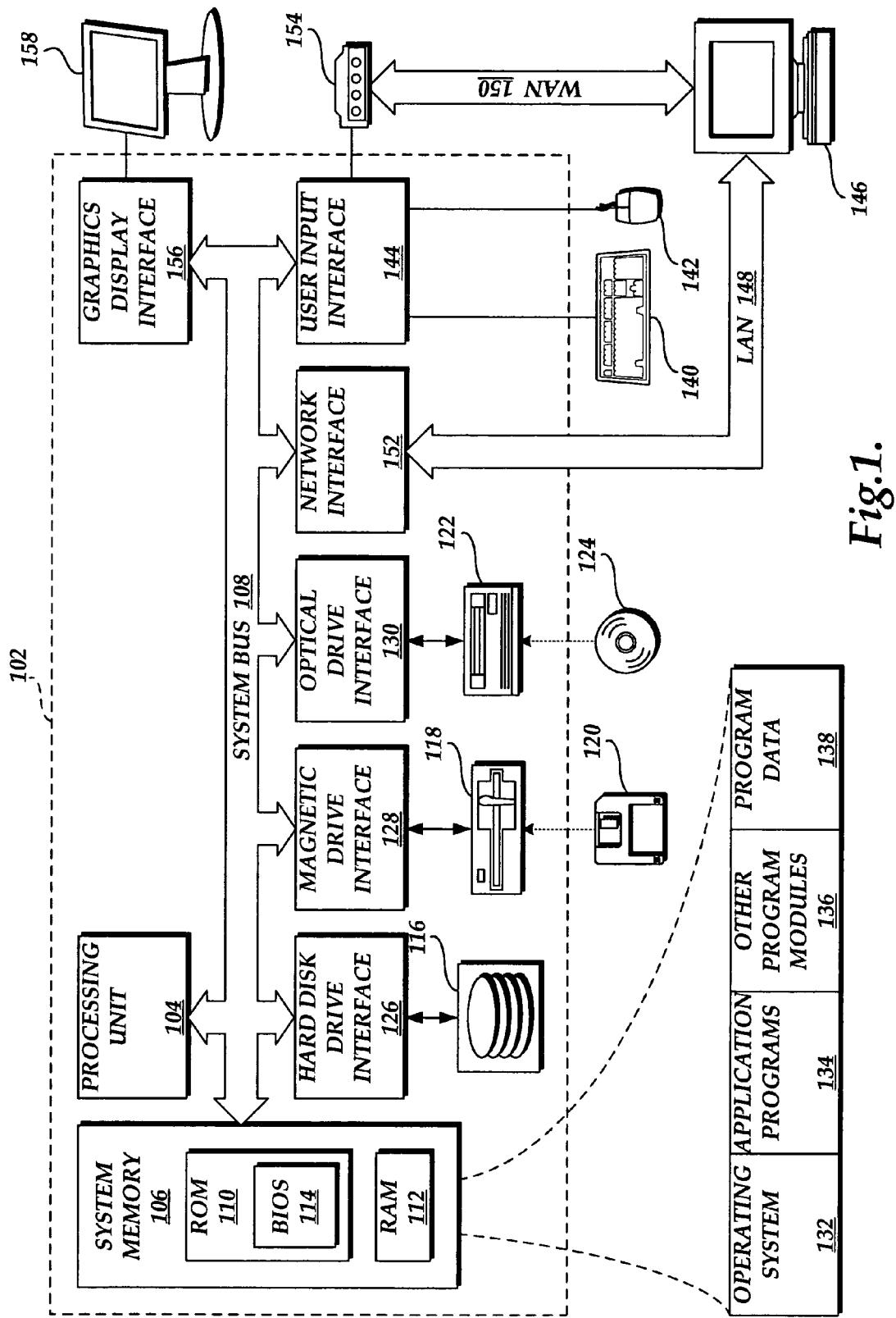
FIG. 1 is a block diagram illustrating an exemplary computer system suitable for implementing aspects of the present invention.

FIG. 1 and the following discussion are intended to provide a brief, general description of a computing system suitable for implementing various features of the invention. While the computing system will be described in the general context of a personal computer usable as a stand-alone computer, or in a distributed computing environment where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices including laptop computers, tablet computers, and the like.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc., that perform particular tasks or implement particular abstract data types.

With reference to FIG. 1, an exemplary system for implementing aspects of the invention includes a conventional personal computer 102, including a processing unit 104, a system memory 106, and a system bus 108 that couples the system memory to the processing unit 104. The system memory 106 includes read-only memory (ROM) 110 and random-access memory (RAM) 112. A basic input/output system (BIOS) 114, containing the basic routines that help to transfer information between elements within the personal computer 102, such as during startup, is stored in ROM 110.

The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk, and a CD-ROM disk, it should be appreciated by those skilled in the art that other types of media that are readable by a computer, including magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touch pad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB).

A display device 158 is also connected to the system bus 108 via a display subsystem that typically includes a graphics display interface 156 and a code module, sometimes referred to as a display driver, to interface with the graphics display interface. While illustrated as a stand-alone device, the display device 158 could be integrated into the housing of the personal computer 102. Furthermore, in other computing systems suitable for implementing the invention, such as a tablet computer, the display could be overlaid with a touch-screen. In addition to the elements illustrated in FIG. 1, personal computers also typically include other peripheral output devices (not shown), such as speakers or printers.

The personal computer 102 may operate in a networked environment using logical connections to one or more remote computers, such as a remote computer 146. The remote computer 146 may be a server, a router, a peer device, or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets, and the Internet. It should be appreciated that the connections between one or more remote computers in the LAN 148 or WAN 150 may be wired or wireless connections, or a combination thereof.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communication link between the computers may be used. In addition, the LAN 148 and WAN 150 may be used as a source of nonvolatile storage for the system.

Figure 2:
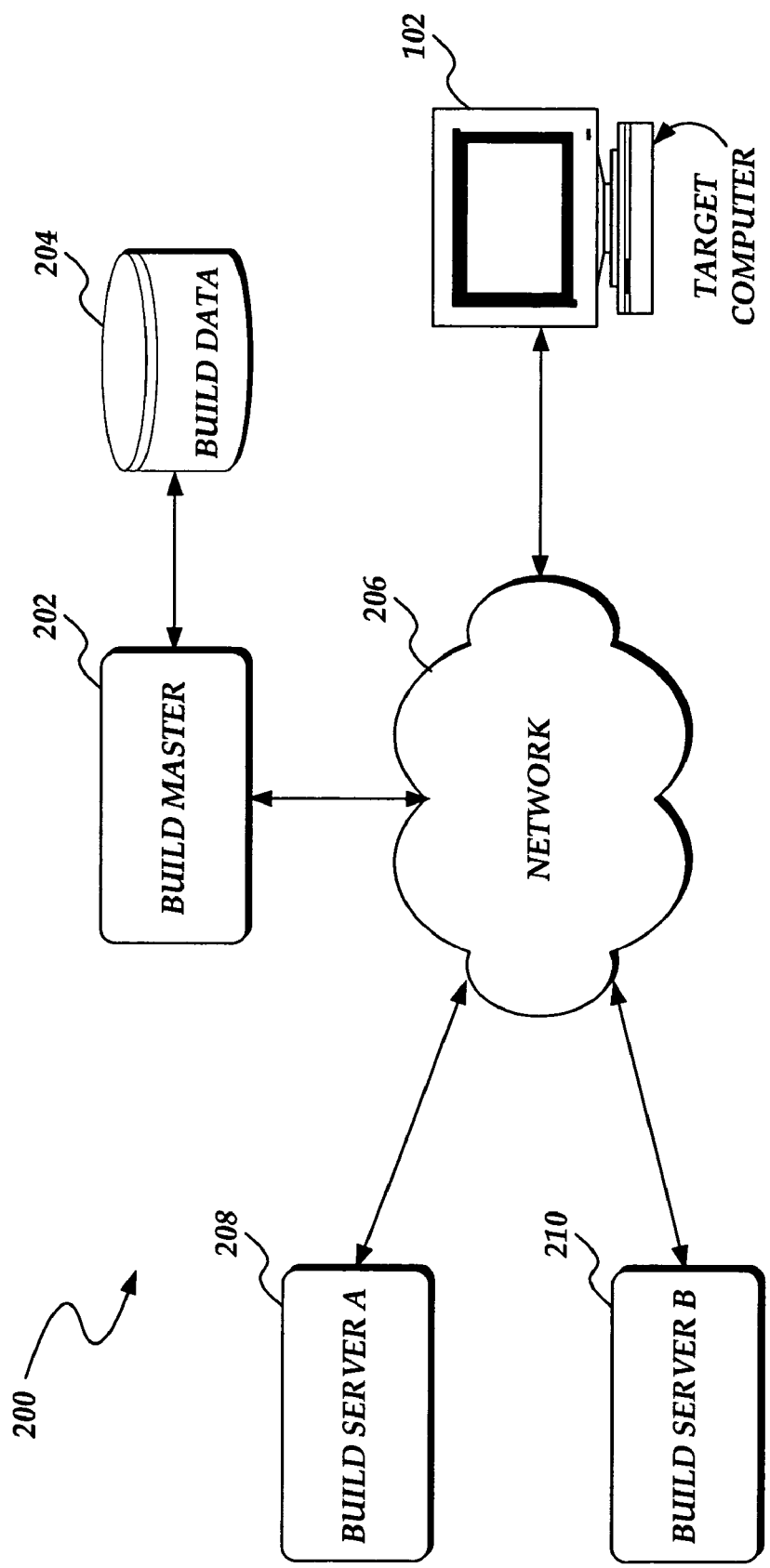
FIG. 2 is a block diagram illustrating components of an exemplary networked environment for implementing aspects of the present invention.

While aspects of the present invention may be implemented on a single computer, such as the computer 102 described above, software applications can be quite large, requiring substantial amounts of storage. Accordingly, the present invention may be beneficially operated in a networked environment where multiple software application builds are advantageously stored on multiple devices. FIG. 2 is a block diagram illustrating components of an exemplary networked environment 200 for implementing aspects of the present invention.

As shown in FIG. 2, the exemplary networked environment 200 includes a target computer 102, such as the computer described above in regard to FIG. 1. It is from the target computer 102 that a software application build is requested. The target computer 102 is connected to a build master 202 via a network 206, such as the Internet. As will be described in greater detail below, the build master 202 responds with information to the target computer 102, including where the target computer can obtain the requested build. This information is stored by the build master 202 as build data 204. While the build data 204 is shown as separate from the build master 202, it is for illustration purposes only, and should not be construed as limiting upon the present invention. In an alternative embodiment, the build master 202 stores and accesses the build data 204 internally.

The exemplary networked environment 200 also includes one or more build servers, such as build server A 208 and build server B 210, connected via the network 206. Each build server, such as build server A 208 or build server B 210, stores a particular build of a software application. For instance, build server A 208 may store a student edition of the sought for software application, while build server B 210 may store a profession edition of the software. It should be noted that for purposes of the present invention, the format in which the build servers store the software application is unimportant. For example, the configuration servers may store the software application builds as a body of installation files. Alternatively, the build servers may store the software application builds as installed images, which may then be duplicated to other computers including the target computer 102, using techniques well known in the art. Accordingly, the present invention should not be construed as limited to storing the software application builds in any particular format.

According to one embodiment of the present invention, the build master 202 and each build server are directly accessible to, and addressable by, the target computer 102. It should be noted that while FIG. 2, as well as subsequent figures, illustrates that the build master 202 and the build servers are separate devices, it is for illustration purposes, and should not be construed as limiting upon the present invention. Alternatively, the build master 202 and the build servers may be logical devices all located on one or more computers connected to the network 206. However, if any of the build master 202 or the build servers are logical devices, they should still be individually and directly addressable from the target computer 102. According to one exemplary embodiment, by associating port numbers to a particular software build, a single networked computer storing multiple software builds can pose as multiple logical build servers, as well as the build master 202.

Figure 3:
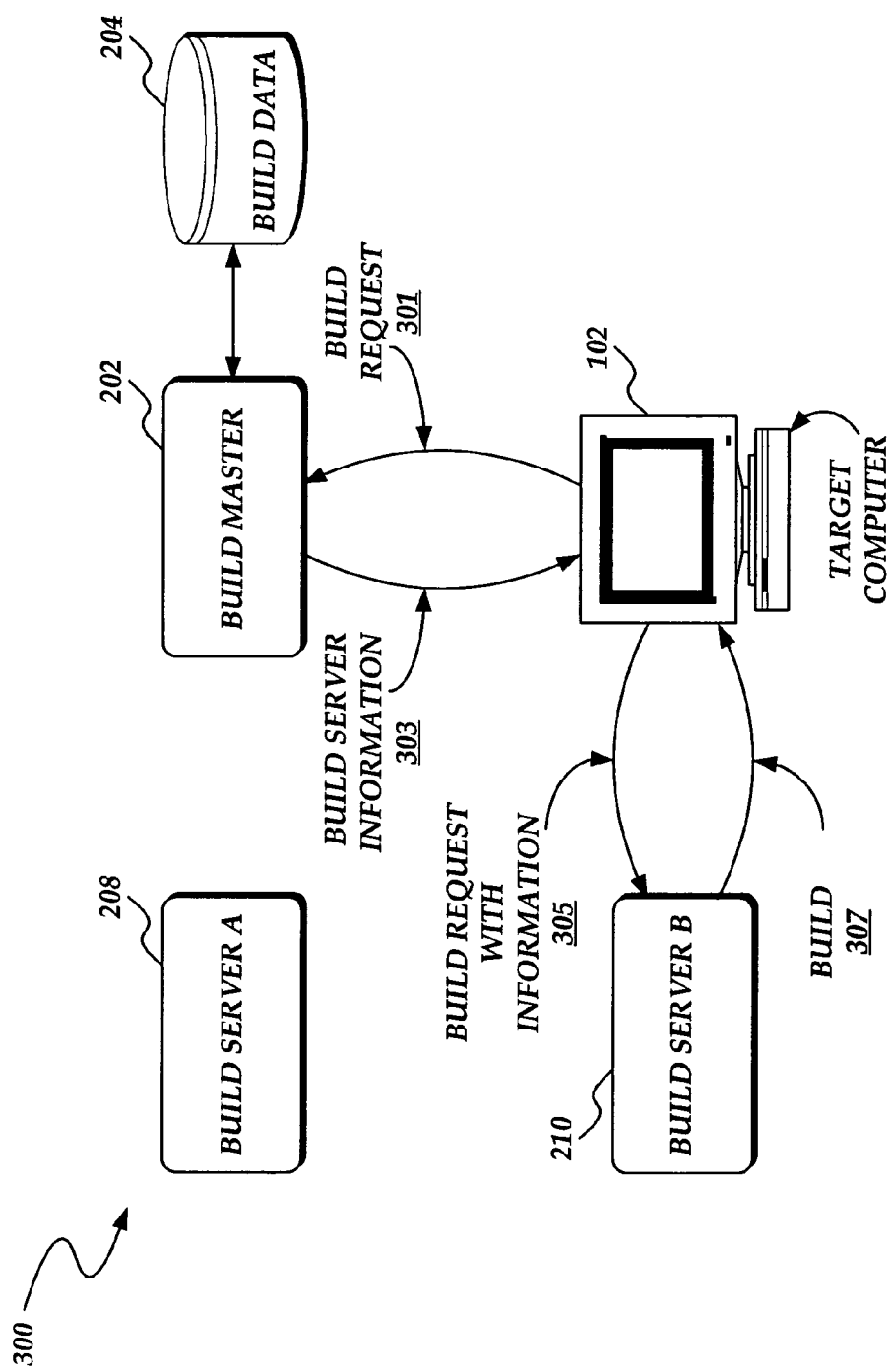
FIG. 3 is a block diagram illustrating an exemplary exchange of information between a target computer and components of the present invention for deploying multiple software application builds to the target computer.

In order to better understand the interaction between the identified components of the present invention, FIG. 3 is a block diagram illustrating the exemplary exchange of information between a target computer and components of the present invention for deploying multiple software application builds to the target computer. Beginning with the target computer 102, a build request is sent from the target computer to the build master 202, as indicated by arrow 301. The build request identifies which, of all of the available software build, is sought. For example, the build request may identify to the build master 202 that a developer build of a particular software application is sought. The request also includes information identifying the requesting party, which is used for authentication purposes. The request may further include other information, some of which may provide additional installation/deployment options, such as default settings, installation directories, and the like. Some of this information may be applicable to all builds of a software application, whereas other information may be specific to a particular build. However, for purposes of the present invention, the additional information accompanying the request does not distinguish one software build from another.

Upon receiving the build request, the build master 202 determines whether the requesting party is authorized to make such a request. Thus, the present invention may be used to track and regulate the distribution of software builds. Accordingly, if the request is not an authorized request, an error is returned and the requesting party on the target computer 102 is denied access to the requested build. However, if the request is authorized, the build master 202 identifies, according to the build data 204, which build server stores the requested build. After determining which build server has the requested build, the build master 202 returns the network location of the identified build server, as indicated by arrow 303. Additionally, the build master 202 also responds with other request data that the identified build server may use to validate that the build request is authorized, prior to releasing the requested build to the target computer 102. This request data may come in the form of a token, possibly encrypted, that the build server will use to validate the request. However, the present invention is not so limited. Other information, reflecting the configuration switches in the request to the build master, may also be included in the response from the build master 202.

As previously mentioned, each build server is directly accessible to the target computer 102. Thus, the target computer may already know the location of the build server that stores the requested build. However, according to aspects of the present invention, each build server releases the requested build only when the requesting party presents valid request data obtained from the build master 202, as described above. Accordingly, in order to ensure that each access to the requested build is authorized, the request data typically contains information to control such access. The request data may include unique identifies that may only be used a single time, or timed tokens that lapse after a certain amount of time. It should be understood that these examples are illustrative, and should not be construed as limiting upon the present invention. Those skilled in the art will recognize any number of mechanisms may be employed to authenticate and track the access to a particular software build.

After receiving the address, or network location, of the build server storing the requested build, and the request data that enables the requesting party to obtain the requested build, the target computer 102 forwards the request data to the identified build server, as indicated by arrow 305. Thus, as illustrated in FIG. 3, the target computer 102 forwards the request data to Build Server B 210. Upon receiving the request data, the identified build server, such as Build Server B 210, validates the request data to determine whether the request is authorized, and if it is, returns the requested build to the target computer 102, as indicated by arrow 307.

There are many situations where it is not advantageous to expose a target computer to the network 204 where the build servers may be found. Securing sensitive/confidential computers and/or data, virus protection, and the like, often mandate that a target computer 102 not be exposed to an external network, or in other words, not be able to directly access either the build master 202, or certain build servers. Accordingly, in order to facilitate the deployment of multiple software application builds to a secured target computer, an alternative, modified configuration may be used.

Figure 4:
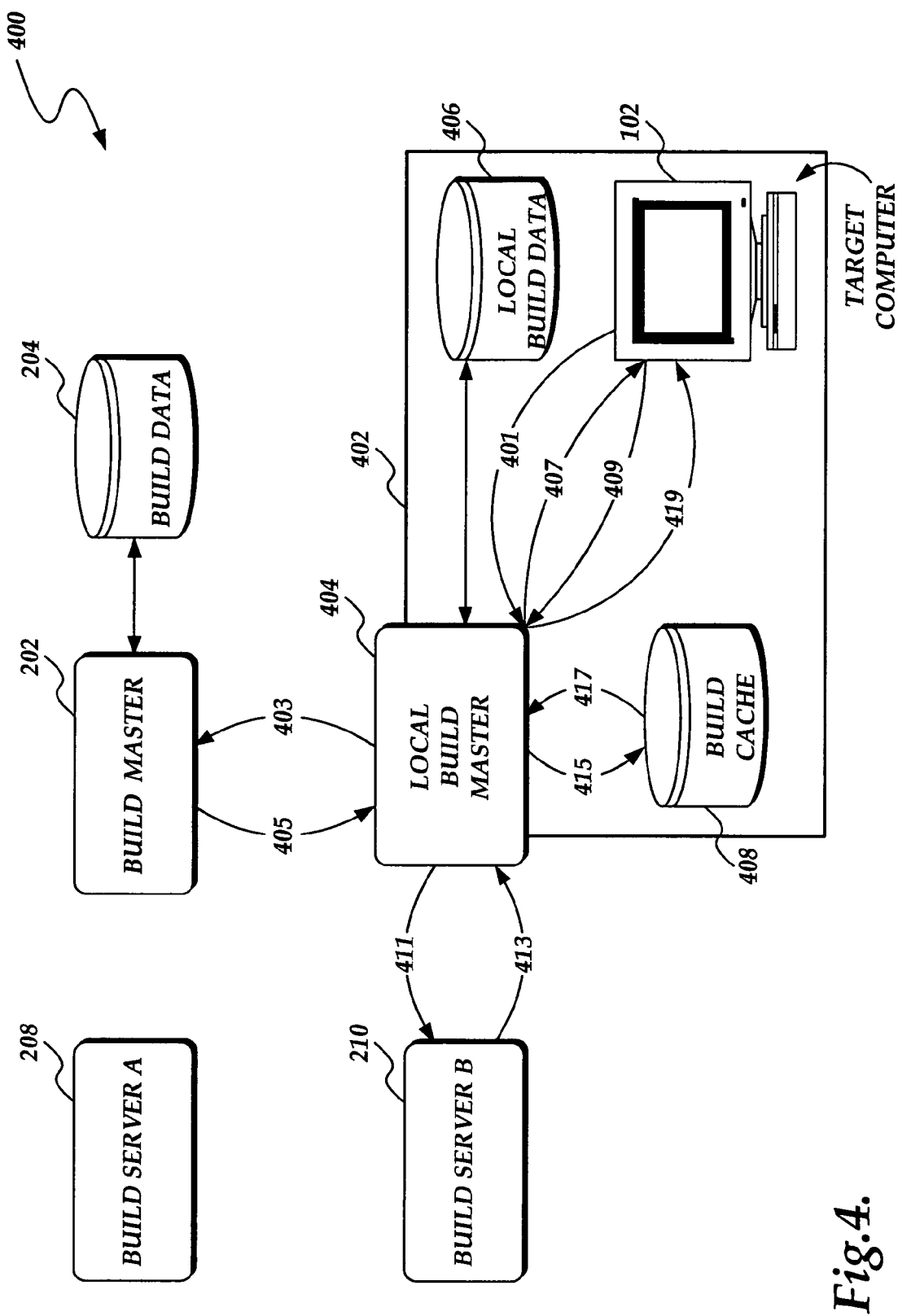
FIG. 4 is a block diagram illustrating components of an alternatively configured environment, and the exchange of information between a target computer and components in an alternatively configured environment for deploying multiple software application builds to the target computer.

FIG. 4 is a block diagram illustrating components of an alternatively configured environment 400, and the alternative exchange of information between a target computer 102 and components in the alternatively configured environment for deploying multiple software application builds to the target computer. As will be seen in the description that follows, the alternatively configured environment 400 is well suited for deploying multiple software application builds to a target computer residing within a secured, or closed, network, where the network has very particular and specific openings/gateways to external networks. Additionally, because the exchange between a target computer and a local build master is the same as between a target computer and a build master and build servers, the alternatively configured environment 400 can be used in distributed and/or hierarchical fashions to distribute processing loads among multiple build masters.

As shown in FIG. 4, the alternatively configured environment may include a secure networked area 402, including the target computer 102 and a local build master 404. The local build master 404, in addition to other duties described below, functions as the access point to the external network 206 (not shown in FIG. 4) for those devices within the secure networked area 402. The local build master 404 is also connected to local build data 406 and local build cache 408. To the target computer 102, the local build master behaves like the build master 202 described above, and, in the case of secure networks, may also pose as build servers to the target computer. Thus, as with the build master 202 described above, the separation of the local build data 406 and local build cache 408 from the local build master 404 is for illustration purposes only, and should not be construed as limiting upon the present invention.

As shown in FIG. 4, the exemplary alternative configuration 400 also includes a build master 202 and build servers, such as build server A 208 and build server B 210, as described above. However, in contrast to being directly accessible to the target computer 102, the build master 202 and build servers are, in this configuration, only directly accessible to the local build master 404. The alternative configuration 400 further includes the build data 204 as described above.

For the requesting party on the target computer 102, gaining access to the requested build is performed in the same manner as described above. Because the local build server 404 can function as both a build master as well as a build server, all requests are transmitted to/through the local build server 404. A greater description of the entire exchange of information between components in this alternatively configured environment 400 follows.

To get access to a particular software build in this alternative configuration 400, a requesting party, from the target computer 102, transmits a request for the particular build to the local build master 404, as illustrated by arrow 401. This request is of the same form, and includes the same request information, as the request described above in regard to FIG. 3. According to one embodiment, the local build master 404 inspects the information in the request to determine first whether it is valid, i.e., whether the request is authorized. If the request is an authorized request, the local build master 404 determines whether the requested build is locally cached. If so, no message is forwarded to the build master 202. Instead, the local build master 404 generates the request data for obtaining the requested software build, and returns the request data to the target computer 102, as indicated by arrow 407.

If the requested build is not cached locally, the local build master 404 submits/forwards the request to the build master 202, as indicated by arrow 403. In yet an alternative embodiment, rather than authenticate the request, the local build master 404 automatically forwards the request from the target computer 102 to the build master 202, as indicated by arrow 403. As described above, the build master 202 then authenticates the request and if authorized, returns request data back to the local build master 404, as indicated by arrow 405. Because the local build master may be the only gateway outside of a secure network 402, upon received the request data from the build master 202, which, as previously discussed, includes information that identifies the location of the build server storing the requested software build, the local build master modifies the request data, such that the target computer 102 submits the request for the software build to the local build master. The local build master 404 then returns the request data to the target computer, as indicated by arrow 407.

After receiving the request data from the local build master 404, the target computer 102 submits the request with the request data to the local build master, which is posing as a build server, as indicated by arrow 409. The local build master 404 examines the request and request data, and if it is now locally cached, submits the request and request data to the build server storing the requested build, such as build server B 210, as indicated by arrow 411. Similar to that described above in regard to FIG. 3, the build server authenticates that the request is an authorized request, and if so, returns the requested build to the local build master 404, as indicated by arrow 413.

After receiving the requested build from a build server, the local build master 404 may optionally store the requested build in its build cache 408, as indicated by arrow 415. The local build master 404 then forwards the requested build onto the target computer 102, as indicated by arrow 419. As previously mentioned, the local build master 404 may already have the requested build locally cached. Thus, when the requested build is locally cached, instead of obtaining the requested software build from a build server, the local build master 404 simply retrieves the requested build from the build cache 408, as indicated by arrow 417, and returns it to the target computer 102.

Figure 5:
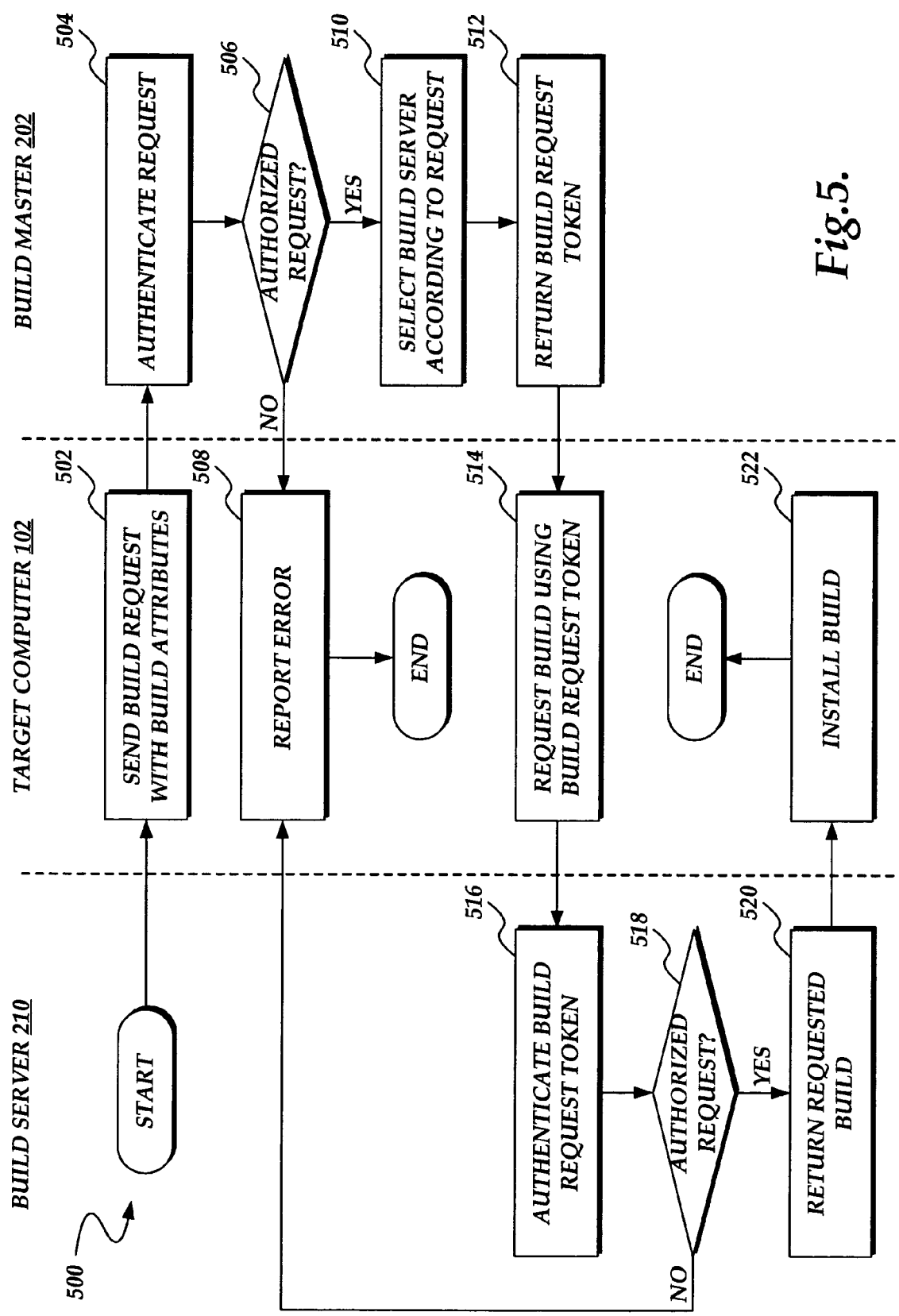
FIG. 5 is a flow diagram illustrating an exemplary method for deploying multiple software application builds to a target computer in accordance with the present invention.

FIG. 5 is a flow diagram illustrating an exemplary method 500 for deploying one of multiple software application builds to a target computer in accordance with the present invention. Beginning at block 502, a build request identifying the sought for build is sent from the target computer 102 to the build master 202.

At block 504, the build master 202 authenticates the request to determine whether the requesting party is authorized to access the sought for build. At decision block 506, a determination is made as to whether the request is authorized. If the request is not authorized, at block 508 an error is reported to the requesting party, and the routine 500 terminates.

If, at decision block 506, the request is authorized, then at block 510, the build master 202 identifies a build server that stores the sought for software build. At block 512, the information identifying the build server with the sought for software build, and request data to be presented to the identified build server, are returned to the target computer 102.

At block 514, the target computer 102 transmits a request with the request data obtained from the build master 202, to the identified build server.

At block 516, the build server authenticates the request data for determining whether the request for the sought for build is authorized, as described above in regard to FIG. 3. At decision block 518, a determination is made as to whether the request is authorized. If the request is not authorized, at block 508 an error is reported to the requesting party, and the routine 500 terminates.

If, at decision block 518, the request is authorized, then at block 520 the sought for build is returned to the target computer 102. At block 522, the sought for build is installed on the target computer 102. Thereafter, the routine 500 terminates.

Figure 6A:
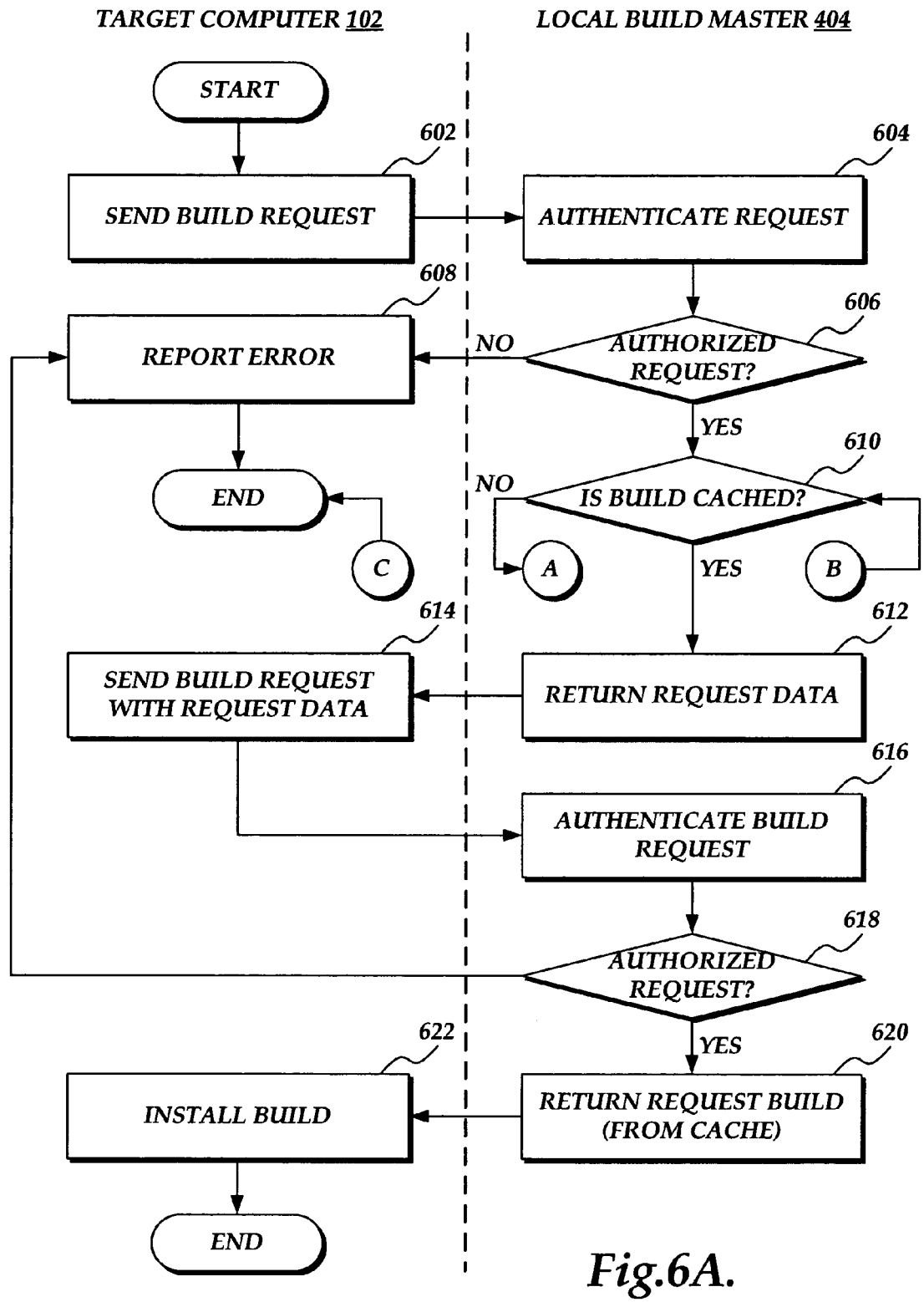
FIGS. 6A and 6B are a flow diagram illustrating an alternative exemplary method for deploying multiple software application builds to the target computer using a local server/network configured environment.
Figure 6B:
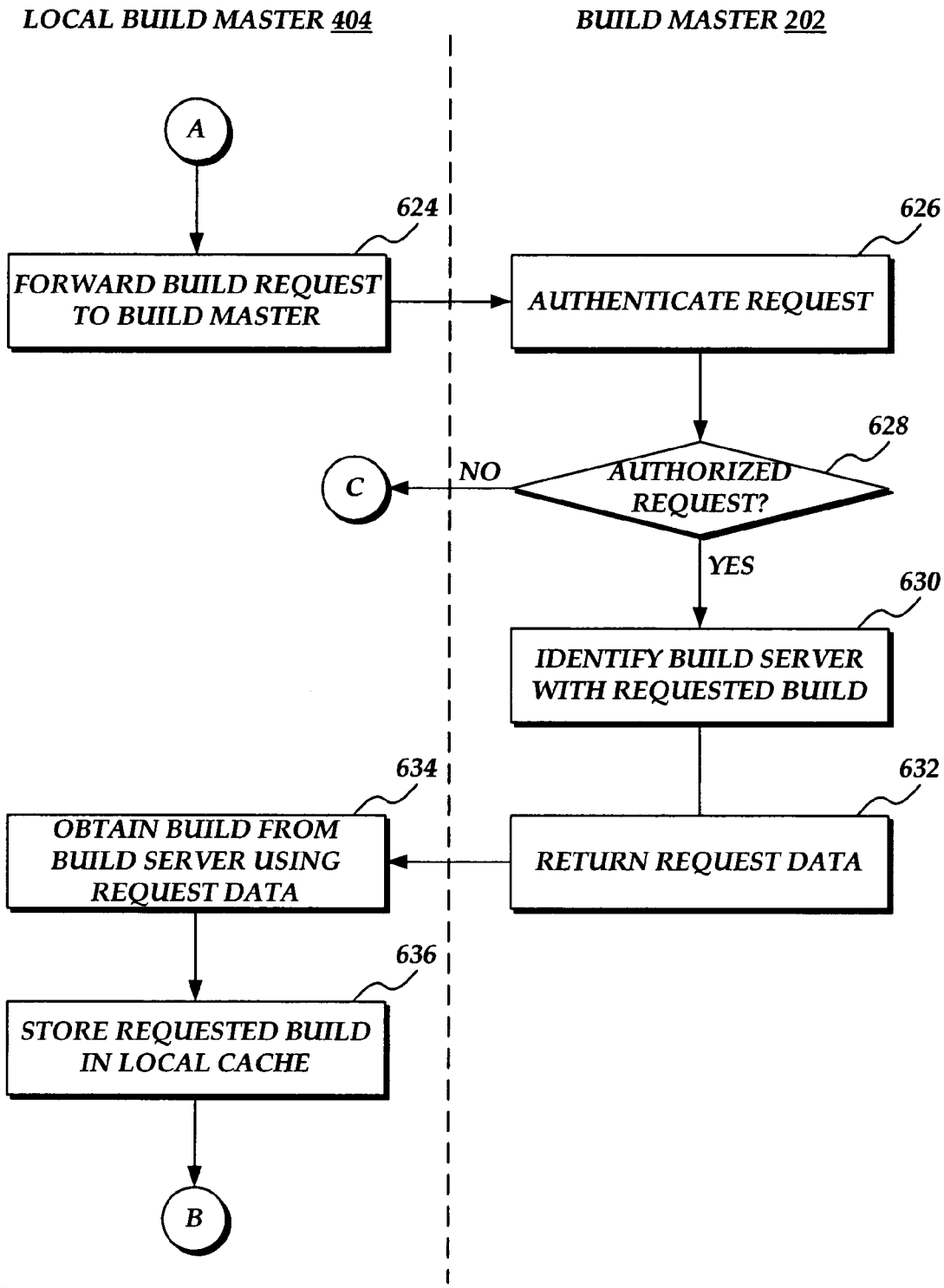

FIGS. 6A and 6B are a flow diagram illustrating an alternative exemplary method for deploying one of multiple software application builds to the target computer using the secure networked configuration 400 described above in regard to FIG. 4. Beginning at block 602, a build request identifying the sought for build is sent from the target computer 102 to the local build master 404.

At block 604, the local build master 404 authenticates the request to determine whether the requesting party is authorized to access the sought for build. At decision block 606, a determination is made as to whether the request is authorized. If the request is not authorized, at block 608 an error is reported to the requesting party, and the routine 600 terminates.

If the request is authorized, at decision block 610, another determination is made as to whether the sought for build is locally cached to the local build master 404. If the sought for build is not locally cached, at block 624 (FIG. 6B), the local build master 404 forwards the request to the build master 202.

At block 626, the build master 202 authenticates the request to determine whether the requesting party is authorized to access the sought for build. At decision block 628, a determination is made as to whether the request is authorized. If the request is not authorized, at block 608 (FIG. 6A) an error is reported to the requesting party, and the routine 600 terminates. Alternatively, if the request is authorized, at block 630, the build master 202 identifies the build server according to the request. At block 632, a response is returned to the local build master 404.

At block 634, the local build master 404 obtains the sought for build from the identified build server using the information returned from the build master 202. At block 636, the local build master locally caches the sought for build. Thereafter, the routine returns again to decision block 610 (FIG. 6A), where a determination is made as to whether the sought for build is locally cached to the local build master 404 (which at this point it should be). If the sought for build is locally cached, at block 612, information identifying the location of the sought for build along with request data to obtain the build is returned to the target computer 102. In this instance, the location will be the local build master 404. However, as previously mentioned, a build server can be a logical device. Hence, in this instance, the local build master 404 can pose as a build server to the target computer 102, and receive the request and request data.

At block 614, the target computer 102 transmits the request with the request data obtained from the local build master 404, to the identified, logical build server, i.e., back to the local build master.

At block 616, the local build master 404, still posing as a build server, authenticates the request for determining whether the request is authorized. At decision block 618, the determination is made as to whether the request is authorized. If it is not authorized, at block 608, an error is reporting to the requesting party at the target computer 102, and the routine 600 terminates. Alternatively, if the request is authorized, at block 620, the sought for build is returned to the target computer. At block 622, the build is then installed on the computer, and the routine 600 terminates.

While the preferred embodiment of the invention has been illustrated and described, it will be appreciated that various changes can be made therein without departing from the spirit and scope of the invention.

The invention claimed is:

1. A computer system for deploying a software build from a plurality of software builds stored in a plurality of build servers onto a target computer, the system comprising:
  a local build master on a local network, wherein the target computer resides within the local network and the local build master has access to an external network hosting a build master, and wherein the local build master is configured to:
    receive a request for a software build from the target computer;
    determine whether the requested software build is locally cached to the local build master;
    if the software build is locally cached, return request data for obtaining the software build from the local cache to the target computer; and
    if the software build is not locally cached, forward the request for the software build to the build master in the external network;
  wherein the build master, in response to a request from the target computer for the software build:
    identifies one or more of said plurality of build servers storing the software build; and
    returns request data for obtaining the software build from the identified build server to the target computer by having the local build master further configured to:
      receive the request data from the build master;
      forward the request for the software build with the request data to the identified build server;
      receive and cache the software build from the build and forward the software build to the target computer; and
  a plurality of build servers, wherein each build server stores one of the plurality of software builds, and wherein each build server, in response to receiving a request with the request data for the software build stored by the build server from the target computer, returns the software build to the target computer.

2. The system of claim 1, wherein the build master further:
  authenticates the request to determine whether it is an authorized request; and
  returns the request data to the target computer only if the request is an authorized request.

3. The system of claim 2, wherein the request data includes address information of the build server for requesting the software build.

4. The system of claim 3, wherein the build server further:
  authenticates the request according to the request data to determine whether request is an authorized request; and
  returns the software build to the target computer only if the request is an authorized request.

5. The system of claim 4, wherein the request data includes authentication information generated by the build master upon the build master determining that the request is an authorized request; and
  wherein the build server authenticates the request according to the authentication information in the request data.

6. A method for deploying a software build from a plurality of software builds stored in a plurality of build servers to a target computer, comprising:

submitting a first request for a software build from the target computer to a local build master, the software build corresponding to one of a plurality of configurations of a particular software application available to the target computer;

in response to the first request submitted to the local build master receivin request data from the local build master if the software build is locally cached; otherwise:

submitting the first request to a build master by way of the local build master; and in response to submitting the first request to the build master by way of the local build master, receiving request data including information identifying at least one build server that stores the software build as an installed image;

upon receiving the request data, submitting a second request with the request data to the at least one identified build server for the software build; and in response to the second request, receiving the software build from the at least one identified build server.

7. The method of claim 6, further comprising authenticating the first request to determine if it is an authorized request, such that the request data is received only if the first request is an authorized request.

8. The method of claim 7, wherein the request data includes address information of the build server for requesting the software build.

9. The method of claim 8, further comprising authenticating the second request according to the request data to determine if the second request is an authorized request, such that the software build is obtained from the build server only if the second request is an authorized request.

10. The method of claim 9, wherein the request data includes authentication information generated when it was determined if the first request was an authorized request.

11. The method of claim 6, wherein submitting a second request with the request data to the identified build server for the software build comprises submitting the second request to the build server via the local build master.

12. The method of claim 11, wherein receiving the software build from the identified build server comprises receiving the software build from the identified build server via the local build master.

13. The method of claim 12 further comprising locally caching the software build to the local build master.

14. A computer-readable medium having computer-readable instructions which, when executed, carry out a method comprising:

receiving a request at a build master from a target computer via local build master for one of a plurality of software builds stored in a plurality of build servers for installation on a target computer, wherein each software build corresponds to a distinct configuration of a single software product available to the target computer, wherein the target computer resides in a local network with the local build master and the build master resides on a network external to the local network, and wherein the local build master has access to the build master on the external network;

selecting a build server of the plurality of build servers storing the requested software build;

generating request data including information identifying the selected build server that stores the software build; and returning the request data to the target computer via the local build master in response to the request.

15. The method of the claim 14, further comprising authenticating the request to determine if it is an authorized request, and returning the request data only if the request is an authorized request.

16. The method of claim 15, wherein the request data includes address information of the build server for requesting the software build.

17. The method of claim 16, wherein the request data includes authentication information generated when it was determined that the first request was an authorized request.

18. The method of claim 14, wherein each of the plurality of software builds is stored as an installed image on a build server.

* * * * *